United States Patent
Weese et al.

(10) Patent No.: US 12,373,953 B2
(45) Date of Patent: Jul. 29, 2025

(54) SEGMENTATING A TUBULAR FEATURE

(71) Applicant: KONINKLIJKE PHILIPS N.V., Eindhoven (NL)

(72) Inventors: Rolf Juergen Weese, Norderstedt (DE); Dominique Siu Li Tio, Hamburg (DE); Cheryl Kimberley Sital, Dordrecht (NL); Tom Brosch, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 395 days.

(21) Appl. No.: 17/637,492

(22) PCT Filed: Aug. 26, 2020

(86) PCT No.: PCT/EP2020/073819
§ 371 (c)(1),
(2) Date: Feb. 23, 2022

(87) PCT Pub. No.: WO2021/037892
PCT Pub. Date: Mar. 4, 2021

(65) Prior Publication Data
US 2022/0277457 A1    Sep. 1, 2022

(30) Foreign Application Priority Data
Aug. 26, 2019    (EP) .................................. 19193547

(51) Int. Cl.
*G06T 7/10* (2017.01)
*G06T 3/60* (2024.01)
*G06T 7/60* (2017.01)

(52) U.S. Cl.
CPC .................. *G06T 7/10* (2017.01); *G06T 3/60* (2013.01); *G06T 7/60* (2013.01); *G06T 2207/20076* (2013.01); *G06T 2207/20081* (2013.01); *G06T 2207/20084* (2013.01); *G06T 2207/20216* (2013.01); *G06T 2207/30101* (2013.01); *G06T 2207/30172* (2013.01)

(58) Field of Classification Search
CPC . G06T 2207/30101; G06T 2207/30172; G06T 7/11; G06T 7/0012; G06T 7/10; A61B 6/504; A61B 8/0891
See application file for complete search history.

(56) References Cited

U.S. PATENT DOCUMENTS 8,634,628 B2    1/2014  Inoue
2016/0361025 A1  12/2016  Reicher
(Continued)

FOREIGN PATENT DOCUMENTS

WO    WO2017151757 A1    9/2017

OTHER PUBLICATIONS

Wolterink, Jelmer M., et al. "Coronary artery centerline extraction in cardiac CT angiography using a CNN-based orientation classifier." arXiv:1810.03143v2, Oct. 24, 2018 (Year: 2018).*
(Continued)

*Primary Examiner* — Raphael Schwartz

(57) ABSTRACT

In a method of segmenting a tubular feature in an image, a sequence of overlapping portions of the image are segmented using a trained model. The overlapping portions are positioned along the length of the tubular feature and combined to determine a segmentation of the tubular feature.

12 Claims, 7 Drawing Sheets

(56) References Cited

U.S. PATENT DOCUMENTS

2017/0109880 A1* 4/2017 Al-Kofahi ............. G06T 11/008
2019/0014982 A1 1/2019 Bhuiyan

OTHER PUBLICATIONS

PCT International Search Report, International application No. PCT/EP2020/073819, Sep. 28, 2020.
Wu A. et al., "Deep Vessel Tracking: A Generalized Probabilistic Approach Via Deep Learning", 2016 IEEE 13th International Symposium on Biomedical Imaging (ISBI), Apr. 1, 2016, pp. 1363-1367, XP055645166.
Qier M. et al., "Tracking and Segmentation of the Airways in Chest CT Using a Fully Convolutional Network", Sep. 4, 2017, International Conference on Financial Cryptography and Data Security; [Lecture Notes in Computer Science; Lect.Notes Computer], Springer, Berlin, Heidelberg, pp. 198-207, XP047454717.
Kitasaka T. et al., "Extraction of Bronchus Regions from 3D Chest X-Ray CT Images by Using Structural Features of Bronchus", International Congress Series, Excerpta Medica, Amsterdam, NL, vol. 1256, Jun. 1, 2003, pp. 240-245, XP027453438.
Zhao J. et al., "Deep Feature Regression (DFR) for 3D Vessel Segmentation", Physics in Medicine and Biology, Institute of Physics Publishing, Bristol GB, vol. 64, No. 11, May 23, 2019, p. 115006, KP020334544.X
Wolterink J.M. et al., "Coronary Artery Centerline Extraction in Cardiac CT Angiography using a CNN-Based Orientation Classifier", Medical Image Analysis, Oxford University Press, Oxofrd, GB, vol. 51, Oct. 22, 2018, pp. 46-60, XP085544959.
Xu Y. et al., "Pulmonary Vessel Segmentation Via Stage-Wise Convolutional Networks with Orientation-Based Region Growing Optimization", IEEE Access, 6, 71296-71305, 2018.
Huang W. et al., "Coronary Artery Segmentation by Deep Learning Neural Networks on Computed Tomographic Coronary Angiographic Images", 2018 40th Annual International Conference of the IEEE Engineering in Medicine and Biology Society (EMBC), pp. 608-611, IEEE, Jul. 2018.
Gou S. et al., "Automated Vessel Segmentation in Pancreas 4D-MRI using a Novel Transferred Convolutional Neural Network", International Journal of Radiation Oncology• Biology• Physics, 102(3), e550-e551, 2018.
Taha A. et al., "Kid-Net: Convolution Networks for Kidney Vessels Segmentation from CT-Volumes", International Conference on Medical Image Computing and Computer-Assisted Intervention, pp. 463-471, Springer, Cham., Sep. 2018.
Chen X. et al., "Train a 3D U-Net to Segment Cranial Vasculature in CTA Volume Without Manual Annotation", 2018 IEEE 15th International Symposium on Biomedical Imaging (ISBI 2018), pp. 559-563, IEEE, Apr. 2018.
Pace D. F. et al., "Iterative Segmentation from Limited Training Data: Applications to Congenital Heart Disease", Deep Learning in Medical Image Analysis and Multimodal Learning for Clinical Decision Support, pp. 334-342, Springer, Cham., 2018.
Duan Y. et al., "Context Aware 3D Fully Convolutional Networks for Coronary Artery Segmentation", International Workshop on Statistical Atlases and Computational Models of the Heart, pp. 85-93, Springer, Cham., Sep. 2018.
Moccia S. et al., "Blood Vessel Segmentation Algorithms—Review of Methods, Datasets and Evaluation Metrics", Computer Methods and Programs in Biomedicine, 2018, 158, 71-91.
Lesage D. et al., "A Review of 3D Vessel Lumen Segmentation Techniques: Models, Features and Extraction Schemes", Med. Image Anal 2009, 13 (6), 819-845.
Brosch T. et al., "Foveal Fully Convolutional Nets for Multi-Organ Segmentation", SPIE Proceedings, vol. 10574, Medical Imaging 2018: Image Processing; 105740U, 2018.
Shin J.E. et al., "Increased Risk of Refractory Mycoplasma Pneumoniae in Children with Atopic Sensitization and Asthma", Korean Journal of Pediatrics, vol. 57, No. 6, pp. 271-277, Jun. 2014.
Ronneberger O. et al., "U-Net: Convolutional Networks for Biomedical Image Segmentation", MICCAI 2015 Lecture Notes in Computer Science, vol. 9351, pp. 234-241, May 2015.
Inoue T. et al., "Robust Bronchus Extraction Using Machine Learning and Minimum Spanning Tree", The Institute of Electronics, Information and Communication Engineers, January 20212.

* cited by examiner

SEGMENTATING A TUBULAR FEATURE

CROSS-REFERENCE TO PRIOR APPLICATIONS

This application is the U.S. National Phase application under 35 U.S.C. § 371 of International Application No. PCT/EP2020/073819, filed on Aug. 26, 2020, which claims the benefit of European Application No. 19193547.7, filed on Aug. 26, 2019. These applications are hereby incorporated by reference herein.

TECHNICAL FIELD

This disclosure relates to image segmentation. Particularly but non-exclusively embodiments herein relate to segmenting images comprising tubular structures such as vascular structures in medical images.

BACKGROUND OF THE INVENTION

Image segmentation involves splitting or partitioning an image into a plurality of segments, each segment corresponding to a different part of the image contents. In medical imaging, for example, an image of an anatomical feature may be segmented into different portions, whereby each segment or portion represents a different anatomical feature in the medical image. Segmentation allows different features in an image to be extracted/isolated for further analysis and/or modeling. Segmentation may be performed in an automated or (partially) interactive manner and has a broad range of applications in medical image processing.

Neural networks such as U-nets or F-nets (as described in the references: Ronneberger O., et al. (2015) "U-Net: Convolutional Networks for Biomedical Image Segmentation"; MICCAI 2015 Lecture Notes in Computer Science, vol 9351, 234-241; and Brosch T., Saalbach A. (2018) "Foveal fully convolutional nets for multi-organ segmentation" SPIE Volume 10574, 105740U) have proven to be useful for the segmentation of anatomical structures and are often among the top performing methods when compared to other segmentation methods. They can also be used to segment vascular structures.

A recent overview of vessel segmentation techniques can be found in S. Moccia et al. 2018: "Blood vessel segmentation algorithms—Review of methods, datasets and evaluation metrics", Computer Methods and Programs in Biomedicine 2018, 158, 71-91.

It is an object of this disclosure to provide improved methods of segmenting a tubular structure, such as vessel, in an image.

SUMMARY OF THE INVENTION

As briefly outlined above, neural networks have shown promise in image segmentation, including the segmentation of medical images. However, segmentation of tubular structures (e.g. such as vascular structures) using standard network architectures, particularly in 3D is challenging because of the relative sizes of vessel structures (very small area) vs background (much larger area). As a result, very large training data sets are needed to achieve good results.

One solution to this is to use data augmentation techniques, such as Generative Adversarial Networks to generate simulated data that can be used to train the neural network. These may be difficult to generalize from 2D to 3D however.

It is thus an object of the embodiments herein to provide improved segmentation techniques for use in segmenting tubular structures, such as, for example, vascular structures.

Therefore according to a first aspect, there is a method of segmenting a tubular feature in an image. The method comprises segmenting a sequence of overlapping portions of the image using a trained model, the overlapping portions being positioned along the length of the tubular feature, and combining the segmentations of the sequence of overlapping portions of the image to determine the segmentation of the tubular feature.

By splitting the segmentation into a sequence of smaller portions in this way, the segmentation task is simplified for the trained model. The amount of context or background information in each portion is less (potentially significantly less) than that in the entire image. Put another way, the tubular feature may be more prominent compared to the background in each portion compared to the entire image and thus easier to segment. The model may be trained more quickly and easily, based on smaller data sets. The resulting trained model may be more reliable (due to the aforementioned simplification of the task). Furthermore, the method may be generalized to three dimensions more readily than some prior art methods.

In some embodiments segmenting a sequence of overlapping portions of the image may comprise: segmenting a first portion of the image, the first portion of the image comprising a first portion of the tubular feature, determining a first point comprised in the tubular feature based on the segmentation of the first portion of the image, determining a first vector lying parallel to the length of the tubular feature at the first point, and determining a second portion in the sequence of overlapping portions of the image based on the first point and the first vector.

In some embodiments the second portion of the image may be determined such that the tubular feature is rotated in the second portion of the image based on the first vector.

In some embodiments the tubular feature may be rotated such that the first vector lies in a predetermined orientation in the second portion of the image.

In this way, because the vessel has roughly the same direction in an image portion, the task for the trained model may be simplified further. In addition, orientation alignment in this way enables data augmentation in 3D by rotating the training data around the predetermined orientation. In 2D, augmentation may be achieved by mirroring of the image portion using the predetermined orientation.

According to a second aspect there is a system for segmenting a tubular feature in an image. The system comprises a memory comprising instruction data representing a set of instructions, and a processor configured to communicate with the memory and to execute the set of instructions. The set of instructions, when executed by the processor, cause the processor to segment a sequence of overlapping portions of the image using a trained model, the overlapping portions being positioned along the length of the tubular feature, and combine the segmentations of the sequence of overlapping portions of the image to determine the segmentation of the tubular feature.

According to a third aspect there is a computer program product comprising a computer readable medium, the computer readable medium having computer readable code embodied therein, the computer readable code being configured such that, on execution by a suitable computer or processor, the computer or processor is caused to perform the method of the first aspect.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION OF EMBODIMENTS

As described above, there are various advantages to using trained models such as neural networks in image segmentation such as medical image segmentation. However, very large training data sets are typically required when segmenting tubular structures such as vessels due to the low area or volume of the tubular structure relative to the background area or volume of the image. This makes it difficult to train models for this task, particularly in 3D images.

Embodiments herein aim to improve upon previous segmentation methods in order to better segment tubular structures such as vessels in medical images.

Figure 1:
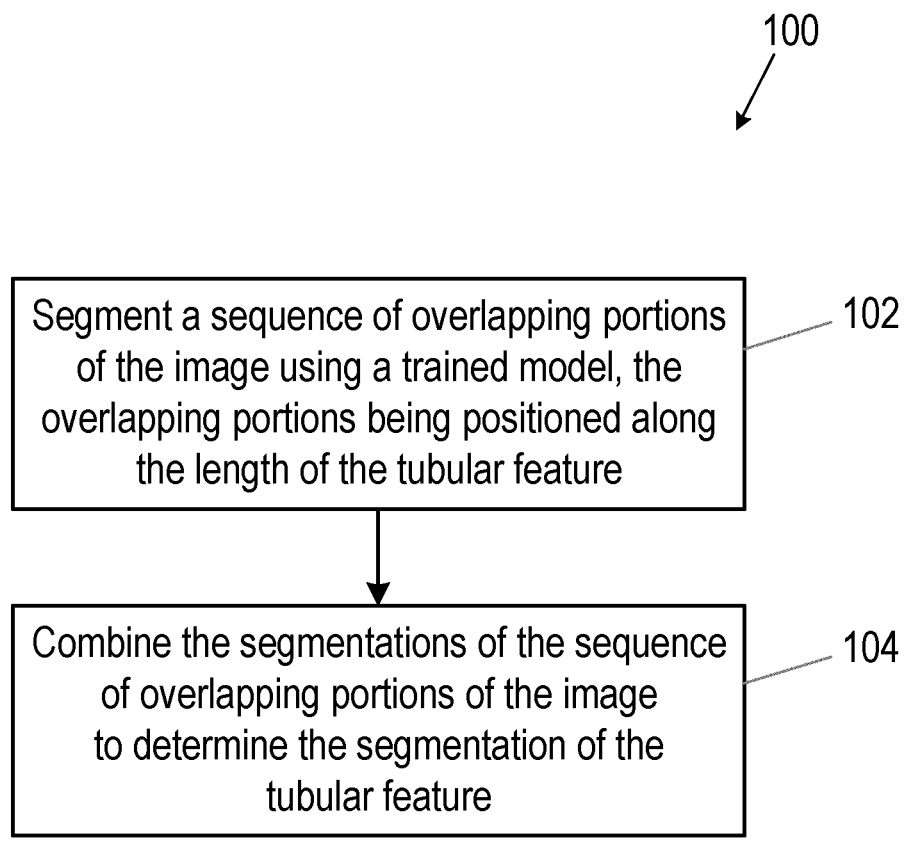
FIG. 1 shows a method according to some embodiments herein.

FIG. 1 illustrates a computer implemented method 100 according to some embodiments herein. Briefly, in a first block 102, method 100 comprises segmenting a sequence of overlapping portions of the image using a trained model, the overlapping portions being positioned along the length of the tubular feature. In a second block 104 the method 100 comprises combining the segmentations of the sequence of overlapping portions of the image to determine the segmentation of the tubular feature.

In this way the segmentation of a long and/or thin tubular feature may be broken down into a sequence of smaller segmentations of smaller portions of the image. This simplifies the task of the trained model as the ratio of tubular feature to background in each image portion is increased, thus reducing the amount of context information in each image portion. As will be described in more detail below, smaller training data sets may be required to train the model to segment a tubular feature in a portion of an image compared to a full image. The resulting model may thus be more reliable and easier to train.

In more detail, generally the image may comprise any type of image, acquired using any imaging modality. For example, in some embodiments the image may comprise a medical image. Examples of medical images include, but are not limited to, a computed tomography (CT) image (for example, from a CT scan) such as a C-arm CT image, a spectral CT image or a phase contrast CT Image, an x-ray image (for example, from an x-ray scan), a magnetic resonance (MR) image (for example, from an MR scan), an ultrasound (US) image (for example, from an ultrasound scan), fluoroscopy images, nuclear medicine images, or any other medical image.

In some embodiments where the image comprises a medical image, the tubular feature may comprise, for example, part of a vascular structure, for example, a vessel or artery. In other examples, the tubular feature may comprise a bronchial structure in the lung.

It will be appreciated however that although the method herein is described with respect to medical imaging, the teachings herein may equally be applied to the segmentation of any other tubular structure in any other type of image. Various examples of segmentation tasks that the method 100 may be applied to include, but are not limited to: the segmentation of a river or tributary system in satellite imagery; the segmentation of a road network in satellite imagery; and the segmentation of the branches in an image of a tree.

Generally therefore it will be appreciated that the teachings herein may be applied to the segmentation of any tubular feature. In some embodiments herein, tubular may be used in the sense of "tube-like" e.g. an elongated or substantially cylindrical feature. The tubular feature may comprise, for example, a hollow tube, such as the aforementioned vessels and/or bronchial structures. The tubular feature is not necessarily hollow however (c.f. for example, the example of a tributary system in a satellite image). Generally, the tubular feature may be curved, bent or otherwise deformed. Furthermore, the tubular feature may narrow in width along its length, for example, the vessels in the vascular system become narrower the further they are away from the main veins and arteries. Embodiments herein also apply to branching tubular features (e.g. where the tubular feature splits into two or more sub-branches) such as those observed in vascular and/or bronchial structures. It will further be appreciated that in two dimensional images, the tubular feature may comprise a line, for example, a curved line.

In any of the embodiments described herein, the image can be a two-dimensional image, a three-dimensional image, or any other dimensional image. The image may comprise a plurality (or set) of image elements. In embodiments where the image is a two-dimensional image, the image elements are pixels. In embodiments where the image is a three-dimensional image, the image elements are voxels.

Turning back to method 100, in block 102, the overlapping portions of the image may be segmented in sequence, one after another using the trained model. The trained model may comprise a trained neural network, such as a trained F-net or a trained U-net. The skilled person will be familiar with neural networks, but in brief, neural networks are a type of supervised machine learning model that can be trained to predict a desired output for given input data. Neural networks are trained by providing training data comprising example input data and the corresponding "correct" or ground truth outcome that is desired. Neural networks comprise a plurality of layers of neurons, each neuron representing a mathematical operation that is applied to the input data. The output of each layer in the neural network is fed into the next layer to produce an output. For each piece of training data, weights associated with the neurons are adjusted until the optimal weightings are found that produce predictions for the training examples that reflect the corresponding ground truths.

In embodiments wherein the trained model comprises a neural network, the neural network may comprise a convolutional neural network like a U-net or an F-net suitable for classifying pixels/voxels into vessel and background. The network might be complemented with additional output channels to estimate the vessel direction and/or the vessel diameter. The network structure might reflect the directional information used for constructing the sub-images and may, for instance, be convolutional in one direction and fully connected in the orthogonal directions. In addition, a network structure might be combined with a recurrent network structure to account for the subsequent segmentations along the vessel course.

In embodiments where the trained model comprises a neural network, the model may be trained using a number $j=1, \ldots, M$ of images and corresponding ground truth segmented tubular features (e.g. binary labeled as either tubular feature or not tubular feature). The segmentation is used to generate, for each training image, a number $N_j$ of points $x_{j,i}$ and corresponding directions $d_{j,i}$ of the tubular feature at each of points $x_{j,i}$. The points and directions may be used to generate sub-images or portions of the image that can be used for training the neural network. This is described in more detail below with respect to FIG. 4.

In addition, data augmentation may be applied during training. For example, slightly shifted sub-images, sub-images rotated slightly around their center or sub-volumes rotated by a large angle around their center using the direction corresponding to the sub-image may be used for data augmentation.

It will be appreciated that although neural networks are described in the examples herein, the principles may be applied equally to any machine learning model that can be trained to take an image as input and predict a segmentation of that image as an output. Other trained models that may be used in embodiments herein include, but are not limited to, trained random forest models. Further details on how the model may be trained are discussed below.

Generally, the trained model takes as input an image (which may be a portion of a larger image as described herein) and produces as output a segmentation of the image. The segmentation may provide an indication of the likely location of the tubular feature in the input image.

In some embodiments, the trained model takes as input an image (which may be a portion of a larger image as described herein) and produces as output a probability map comprising probability values describing the likelihood that each image element in the input image comprises part of the tubular feature.

Alternatively, in some embodiments, the trained model may take as input an image (which may be a portion of a larger image as described herein) and produces as output a map that classifies each image element as either part of the tubular feature or not part of the tubular feature (e.g. vessel or non-vessel).

In addition to the segmentation, the trained model may provide further output estimations of other characteristics of the tubular feature in the image, for example, the trained model may be trained to output, for each image element (e.g. pixel/voxel) a vector lying parallel to the length of the tubular feature at the image element (e.g. a direction vector describing the direction or centerline of the vessel at each point). Other features may also be predicted, for example the diameter or curvature of the tubular feature at each image element.

In some embodiments, segmenting a sequence of overlapping portions of the image using a trained model 102 may comprise a recursive approach to using a trained model such as a neural network to segment a tubular feature (such as a vessel). Using a vessel as an example, the recursive approach may use a point $x_i$ on or close to a vessel centerline and an approximate centerline direction $d_i$. The centerline direction comprises a direction lying parallel to or along the length of the tubular feature at the first point. This information is used to generate a reformatted portion or sub-image with a center shifted in the vessel direction (e.g. along the vessel) with respect to the point $x_i$. The trained model (e.g. neural network or other learned filter) is then applied to segment the vessel in the volume. From the segmentation of the reformatted portion of the image, a new point is selected, and a new centerline direction is determined at the new point. The process is then repeated to produce a segmented sequence of overlapping portions of the image.

Figure 2:
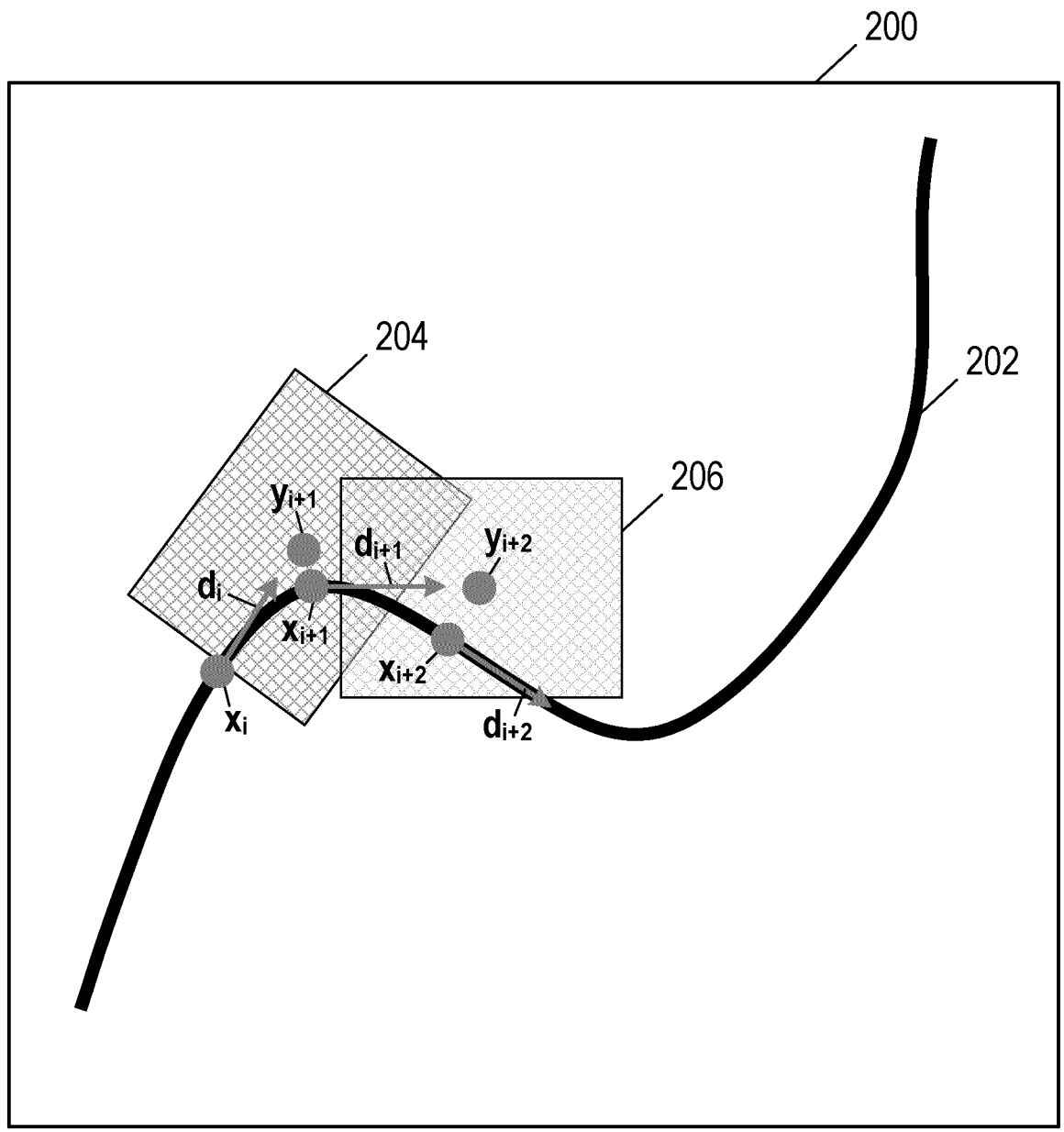
FIG. 2 is a schematic illustrating how the positions of a sequence of overlapping portions may be determined according to some embodiments.

This is shown in FIG. 2 which illustrates how two overlapping portions 204 and 206 in a sequence of overlapping portions may be determined or positioned in an image 200 of a vessel 202. In this example, the vessel segmentation takes as input a point $x_i$ close to the vessel centerline and an approximate centerline direction $d_i (\|d_i\|=1)$ at the point $x_i$. As noted above, the centerline direction comprises a direction lying parallel to (e.g. along) the length of the tubular feature at the first point.

With this input, a portion 204 of the image 200 (e.g. a sub-image) centered on the image element $y_{i+1}=x_i+a\,d_i$ is generated. a determines the distance of a "shift" between the portions along the vessel. This portion (or sub-volume) may have fixed dimensions and resolution. A trained model is then applied to portion 204 to segment the portion 204.

In this embodiment, the trained model comprises a trained neural network that outputs a probability map describing the relative likelihood that each image element in the portion 204 comprises a vessel (e.g. a "vesselness" value). The neural network may also compute a vector for each image element, describing a centerline vector as described above. The probability map (possibly together with the additional directional information) is then transformed back into the coordinate system of the 2D image.

From the probability map, a new point $x_{i+1}$ that likely corresponds to a vessel, and a corresponding centerline direction $d_{i+1}$ is determined at the point $x_{i+1}$. The point $x_{i+1}$ may, for example, be selected as the image element in the segmentation of the portion 204 having the highest probability of comprising a vessel. The process is repeated to obtain the next portion in the sequence, portion 206, from the point $x_{i+1}$ and the vector $d_{i+1}$. In this way, with each iteration, a new portion of the vessel is segmented, without the need to segment the entire image 200

To put the description above in more general terms, in some embodiments, step 102 may comprise iteratively performing the following blocks: i) segmenting a first portion (e.g. portion 204) of the image, the first portion of the image comprising a first portion of the tubular feature, ii) determining a first point (e.g. $x_{i+1}$) comprised in the tubular feature based on the segmentation of the first portion of the image, iii) determining a first vector (e.g. $d_{i+1}$) lying parallel to the length of the tubular feature at the first point, and iv) determining a second portion (e.g. portion 206) in the sequence of overlapping portions of the image based on the first point (e.g. $x_{i+1}$) and the first vector (e.g. $d_{i+1}$).

In some embodiments, in block i) the first portion 204 may be provided as an input parameter, for example the first portion may be determined manually, for example by a user. The user may provide the location of the first portion as input to the method.

In other embodiments, input parameters to the method may comprise an initial starting point $x_i$ and an initial starting direction $d_i$ from which the location of the first portion 204 may be determined according to the equation $y_{i+1}=x_i+a\ d_i$ as described above. The initial starting point $x_i$ and initial starting direction $d_i$ may be input (e.g. manually) by a user, or determined in an automated process, for example, from an initial (e.g. coarse) segmentation of the image 200.

Turning now to block ii), the first point (e.g. $x_{i+1}$) may be determined from the segmentation of the first portion. For example, in embodiments where the segmentation of the first portion produces a probability map, (e.g. for embodiments where for each image element in the first portion of the image, a probability value is determined indicating the probability that the image element is comprised in the tubular feature), the block of determining a first point comprised in the tubular feature based on the segmentation of the first portion of the image, may comprise determining the first point based on image elements in the segmentation of the first portion of the image having a probability value above a predetermined threshold. The predetermined threshold may comprise a threshold (probability) corresponding to a high likelihood that an image element comprises a vessel. In other words, the first point may be chosen from image elements indicated as being most likely to form part of the tubular feature in the segmentation of the first portion.

The predetermined threshold may be set as a constant value or set/varied based on the properties of the tubular feature in different portions of the image. For example, the predetermined threshold may be decreased as the tubular feature decreases in size, to reflect the fact that the tubular feature may be fainter in the image as it decreases in size. As noted above, in some embodiments, the trained model may be trained to output an estimate of diameter of the tubular feature at each image element of the image and as such the magnitude of the predetermined threshold may be set/varied based on the estimated diameter of the tubular feature at each point.

In other embodiments, the first point may be determined from the segmentation of the first portion of the image as the image element having the highest probability that the image element comprises a vessel (e.g. the most likely pixel or voxel in the image portion to be part of a vessel.)

Turning to block iii), the first vector (e.g. $d_{i+1}$ as shown in FIG. 2; also referred to herein as the centerline direction or directional vector) lies parallel to the length of the tubular feature at the starting point $x_i$. In other words, the first vector lies along the primary axis of the tubular feature and thus represents a centerline direction along the tubular feature at the point $x_{i+1}$. It will be appreciated that the vector $d_{i+1}$ could equally be inverted to determine a sequence of portions of the tubular feature in the opposite direction along the tubular feature 202 to that shown in FIG. 2. In general, the direction of $d_{i+1}$ may be chosen such that $(d_i,d_{i+1})=\cos\alpha>=0$ (where $\alpha$ is the angle between $d_i$ and $d_{i+1}$). in such an example, the tracking direction may then defined by the initialization (e.g the first point and first direction).

In some embodiments, block iii) may comprise determining the first vector $d_{i+1}$, for example, by analyzing the probability values in the segmentation of the first portion using a Hessian filter and selecting a direction $\pm d^H_{i+1}$ most parallel to $d_i$.

In other embodiments, block iii) may comprise using a neural network to estimate for each image element in the portion, a direction $d_{i+1}$. For example, in some embodiments, the trained model may be trained to take as input a portion of the image and output both a segmentation of the portion and, for each image element in the portion, a vector indicating an estimated direction that lies along the tubular feature at that image element.

Turning to block iv), determining a second portion (e.g. portion 206) in the sequence of overlapping portions of the image based on the first point (e.g. $x_{i+1}$) and the first vector (e.g. $d_{i+1}$) may comprise determining the center of the second portion of the image according to the equation:

$$y_{i+2}=x_{i+1}+a\ d_{i+1};$$

wherein $y_{i+2}$ comprises a coordinate at the center of the second portion of the image, $x_{i+1}$ comprises a coordinate of the first point, a determines the distance of a "shift" between the portions along the vessel and $d_{i+1}$ comprises the first vector.

As noted above, the a represents the distance, e.g. shift or offset between the first and second portions 204, 206 of the image and may be provided as a configuration or input parameter. In some embodiments, the parameters a, and the desired width and/or height of the portions may be provided as input parameters to the method 100.

In some embodiments, a is a constant. In other embodiments, a might be varied, for instance, in dependence of properties of the tubular feature such as the diameter or curvature (estimates of which may be obtained as additional outputs of the segmentation performed by the trained model as described above).

The size (number of pixels/voxels in each dimension) and resolution (geometric size of a pixel/voxel) of the portions of the image may be set as constant input parameters. Alternatively, they may also be varied. For example, when tracking a tubular structure like a vessel in direction of the blood flow, the diameter of the vessels generally becomes smaller. As such, the size (number of pixels/voxels in each dimension) and resolution (geometric size of a pixel/voxel) of the portions of the image may be varied according to, for example the diameter or curvature (estimates of which may be obtained as outputs of the trained model as described above).

As an example, in one embodiment, the size (number of pixels/voxels in each dimension) may be maintained along a tubular feature as it gets narrower, whilst increasing the resolution (i.e. decrease the geometric size of a pixel/voxel). This provides a more computationally efficient method compared to choosing a high resolution throughout.

Turning now to other embodiments, in some embodiments, the second portion 206 may be determined such that the tubular feature is rotated in the second portion of the image based on the first vector $d_{i+1}$. For example, the tubular feature may be rotated in each portion, relative to the original image.

In some embodiments, the first vector (e.g. $d_{i+1}$) may define a coordinate axis of the (reformatted) second image portion 206. For example, the second portion 206 may be rotated or selected from the image 200 such that the first vector $d_{i+1}$ lies parallel to the edge of the second portion 206. By rotating or selecting the image portions in this way, the orientation of the tubular feature in each image portion is changed so that the tubular feature approximately lies in the same orientation in each image portion. For example, if the second portion is selected such that the first vector $d_{i+1}$ lies parallel to the x axis of the second portion, then the tubular feature will lie approximately parallel to the edge of the second image portion. This has the technical effect of further reducing the complexity of the problem for the trained model, as the orientation and thus appearance of the tubular feature is more regularized in each image portion. Thus, the model may be trained to a higher degree of accuracy based on less training data.

It will be appreciated that the particular orientation of the tubular feature in the image is not important, rather the advantages above may be obtained if the portions of the image are selected or rotated such that the tubular feature is approximately in the same orientation in each image portion (be that orientation horizontal, diagonal or vertically across the image portions). Thus, in some embodiments, the tubular feature is rotated such that the first vector lies in a predetermined orientation in the second portion of the image.

More generally, in some embodiments, the tubular feature is rotated such that the tubular feature lies in a predetermined orientation in the second portion of the image. E.g. the portions in the sequence of overlapping portions may be selected or rotated such that the tubular features therein lie (substantially) in a particular orientation.

In some embodiments the tubular feature may be rotated such that the tubular feature lies, for example, within +/−45 degrees of a particular direction or orientation in each portion of the image.

It will further be appreciated that due to the curved nature of many tubular features considered herein (e.g. vessels or bronchial structures), that the tubular feature may not be perfectly aligned in a particular direction relative to the edges of the respective portion of the image (for example, in FIG. 2, although the direction vector $d_{i+1}$ is aligned with the edge of the image portion 206, the tubular feature lies at an angle to said edge due to the curvature of the tubular feature in the direction $d_{i+1}$ from the point $x_{i+1}$). However rotating/selecting the portions in this manner still reduces the number of degrees of freedom in the orientation of the tubular feature in the image portions compared to if the tubular features were randomly oriented, and thus this reduces the complexity of the problem for the trained model, increasing its accuracy and reducing the amount of training data required. This is particularly true in three dimensions, where the rotation described above may ensure that the tubular feature enters the volume of each three-dimensional portion at a similar position in each image portion.

In embodiments where the portions of the image are rotated, the trained model may be trained on training data comprising a) example images comprising portions of tubular features wherein each example image is rotated based on the predetermined orientation, and b) corresponding ground truth segmentations for each example image. In other words, the image portions comprised in the training data may be rotated such that the tubular features in the training data lie (substantially) in a particular orientation. As noted above, less training data is needed in embodiments where the image portions are rotated so that at least part of the tubular structure lies in a common orientation as the variation in positions and orientation of the tubular features is reduced.

Turning now to other embodiments, it will be appreciated that blocks i)-iv) may be repeated in an iterative fashion along the length of the tubular feature. For example, in some embodiments the method may comprise determining a second point comprised in the tubular feature based on a segmentation of the second portion of the image, determining a second vector lying parallel to the length of the tubular feature at the second point, and determining a third portion in the sequence of overlapping portions of the image based on the second point and the second vector.

The block 102 of method 100 may terminate when the tubular feature comes to an end, for example if a segmentation of a portion indicates that there is no tubular feature in that portion. For example, the method may comprise ceasing to segment further portions of the image if a segmentation of a portion in the sequence of overlapping portions comprises probability values that are all below the (aforementioned) predetermined threshold (e.g. if the probability values are below the threshold for selecting the next point on the tubular feature in a particular image portion).

The predetermined threshold may be set as a constant value or set/varied based on the properties of the tubular feature in different portions of the image. For example, the predetermined threshold may be decreased as the tubular feature decreases in size, to reflect the fact that the tubular feature may be fainter in the image as it decreases in size. As noted above, in some embodiments, the trained model may be trained to output an estimate of diameter of the tubular feature at each image element of the image and as such the magnitude of the predetermined threshold may be set/varied based on the estimated diameter of the tubular feature at each point.

As also noted above, the tubular feature may be branching such that a tubular feature splits into two more branches or separate tubular features. Identifying more than one point lying a predefined distance from a known point in the tubular feature and having a probability value in the segmentation above a threshold probability may indicate different branches of a bifurcation.

More generally, therefore, in some embodiments the method may comprise determining a third point in the segmentation of the first portion of the image, the third point having a probability value above the predetermined threshold and lying more than a predetermined distance from the first point, and determining a bifurcation in the tubular feature, based on the locations of the first point and the third point.

The predetermined distance is thus the minimum separation between two points that are above the predetermined threshold (indicating they are both likely to form part of the tubular feature), required for the points to be labeled as being in separate branches/for the method to spawn a second sequence of overlapping images.

The predetermined distance may also be set and/or varied based on the properties of the tubular feature in different portions of the image. For example, the predetermined distance may be decreased as the tubular feature decreases in size. In embodiments where the trained model outputs an estimate of diameter of the tubular feature at each image element of the image, the magnitude of the predetermined distance may be set/varied based on the estimated diameter of the tubular feature at each point.

If two (or more) image elements are determined in this manner, the method may comprise stepping along the two branches (e.g. second or subsequent sequences of overlapping portions of the image may be processed in parallel).

Turning back now to FIG. 1, in block 104, the method comprises combining the segmentations of the sequence of overlapping portions of the image to determine the segmentation of the tubular feature. The segmentations of the sequence of overlapping portions of the image may, for example, be averaged or otherwise superimposed onto one another to create a combined segmentation of the full tubular feature.

In some embodiments block 104 may comprise averaging image element values in the segmentations of the sequence of overlapping portions of the image in regions of the segmentations that are overlapping. For example, in embodiments where the segmentations produced by the trained model comprise a probability map, if two or more probabilities are determined for a particular image element (e.g. if the element is comprised in an overlapping region between two image portions) then the probabilities may be averaged (e.g. mean, mode, or median). In some embodiments a threshold majority voting process may be used to determine a probability for a particular image element.

Combining segmentations in overlapping regions, for example by averaging two or more estimates of the probability that an image element comprises a vessel, has the technical effect of providing an improved estimation of the probability that an image element comprises a vessel and thus an improved segmentation. The segmentation process is overall more efficient as only areas of the larger image known/determined to contain the tubular feature of interest are segmented.

In some embodiments, in block 104 a weighting mask may be applied when the sequence of segmentations are combined. The weighting mask may be applied such that image elements closer to the center of an image portion get a higher weight compared to image elements further away from the center of an image portion.

Figure 3:
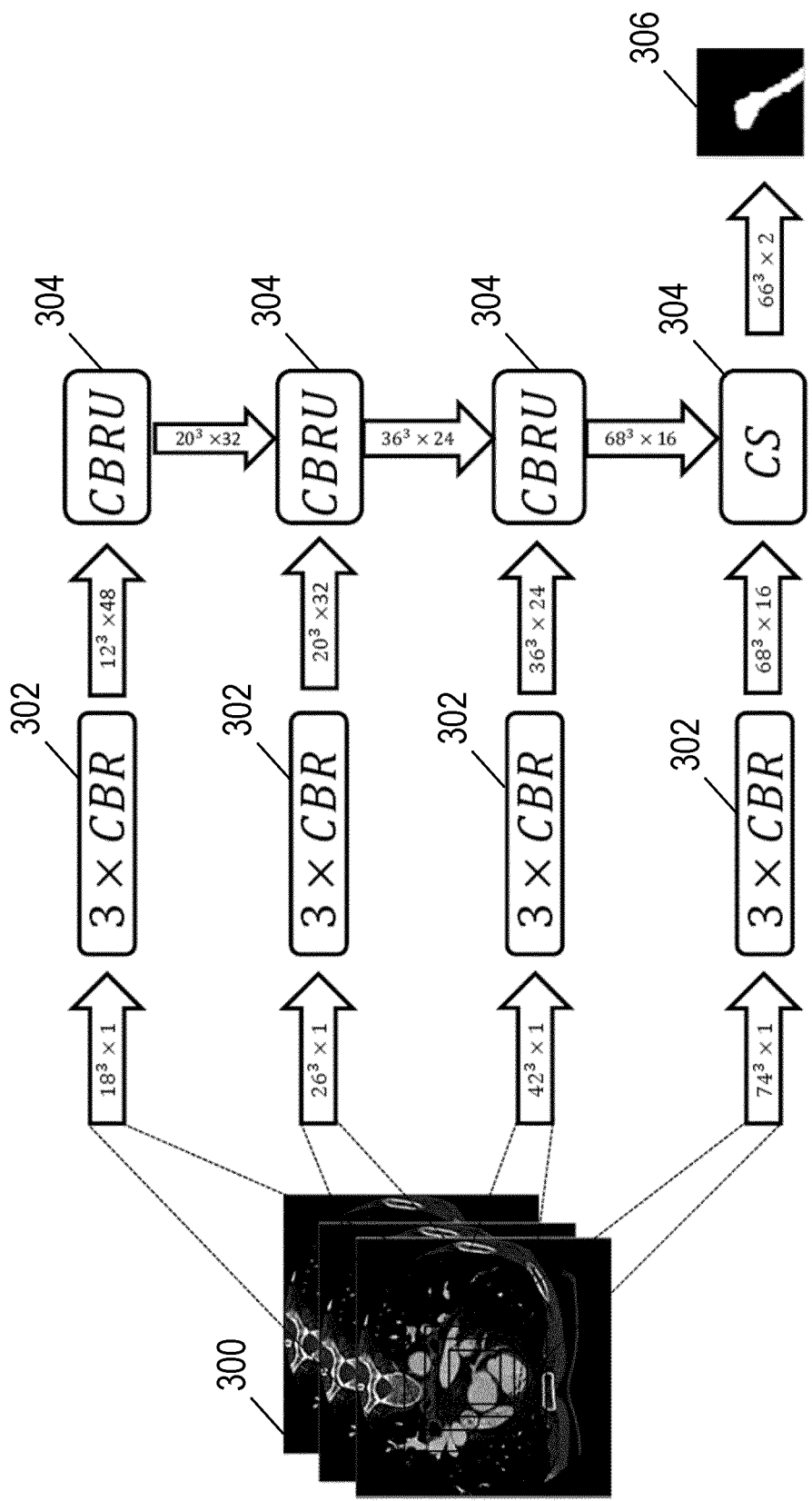
FIG. 3 shows an example architecture of a neural network according to some embodiments.

Turning now other embodiments, in a particular embodiment the tubular feature comprises a vessel in a cardiac computed tomography angiography (CCTA) image 300. In this embodiment, the model comprises a neural network as shown in FIG. 3. In the example of FIG. 3, the architecture employed is an F-Net. F-Net1 is similar to U-Net2 as it is able to look at different resolutions in order to combine local and global image features. The feature extraction paths in F-Net comprise three CBR blocks 302 (Convolution, Batch normalization, ReLu). The feature integration paths in F-Net consist of CBRU blocks 304 (Convolution, Batch normalization, ReLu, Upsampling) (except for the highest resolution level). In this embodiment, the number of resolution levels (as indicated by the rows comprising CBR blocks) used is 4. The neural network outputs a segmentation 306 of the image 300.

The neural network is trained to segment the vessels in the CCTA image using a training data set comprising 39 cardiac computed tomography angiography (CCTA) images. 30 of these images are used to train the neural network and are split into a sequence of rotated portions positioned along the length of the tubular feature, e.g. representative of the portions as described above. 9 of the images are used as test/validation images with which to test the accuracy of the trained neural network. Using data augmentation (such as automated methods to produce imitated test data), the number of training samples (e.g. training image portions) can be increased to up to 26,500 samples.

Figure 4:
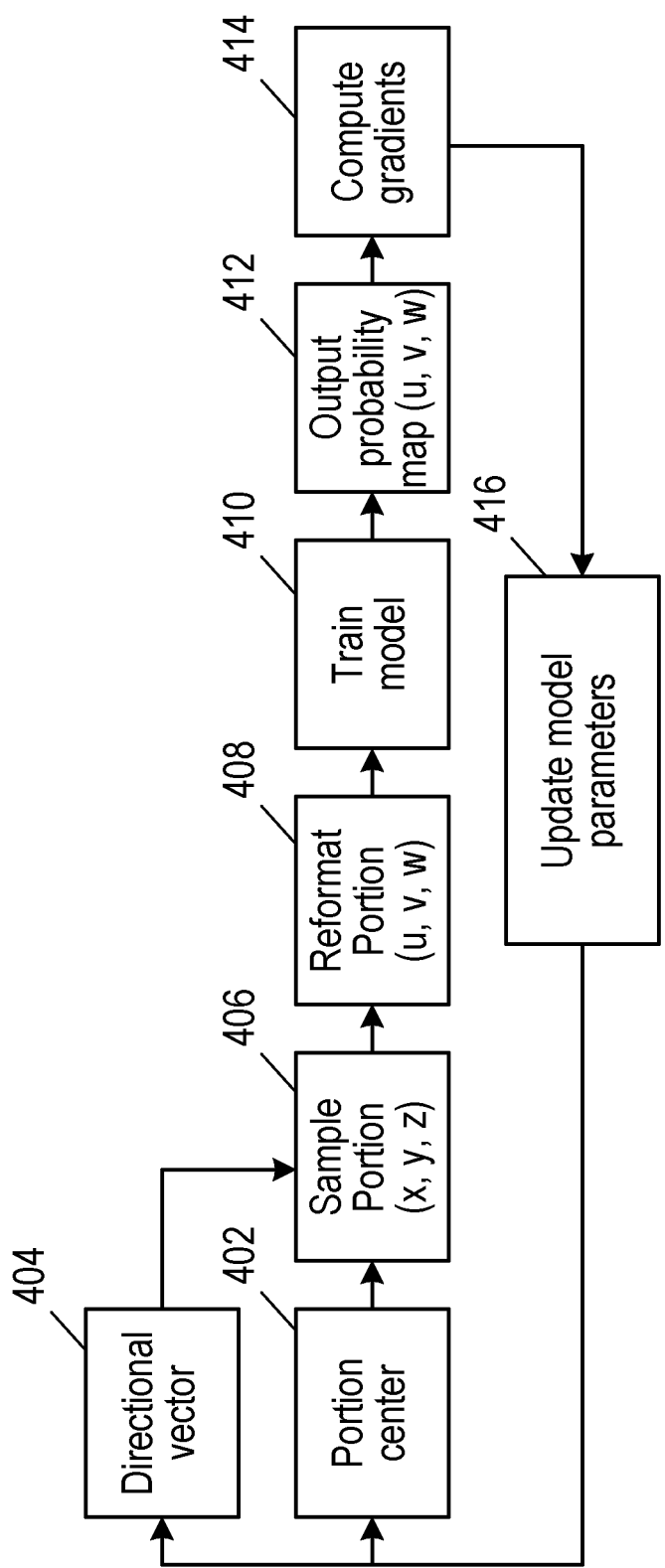
FIG. 4 is a block diagram illustrating a method for training a neural network according to some embodiments.

An example training strategy is illustrated in the flow chart of FIG. 4. In blocks 402 and 404 a portion center and centerline direction may be used to determine a sample portion in block 406 (in a similar manner to how the first portion was determined as outlined above with respect to block 102 of method 100). The sample portion is reformatted, or rotated/selected such that the direction vector lies in a particular orientation in the portion in block 408. This defines a new coordinate system (u,v,w) for the portion, relative to the coordinate system (x,y,z) of the training image. The augmented portion is used to train the model in block 410. The model produces an output probability map in block 412, in the coordinate system (u, v, w) and is used to update the gradients 414 (according to a gradient descent process) by comparing the probability map produced by the model to a ground truth probability map for the image portion. The model parameters are updated in block 416. Generally, the outputs for all (or a subset of) image portions may be accumulated and gradient updates may be based on accumulated values.

Figure 5:
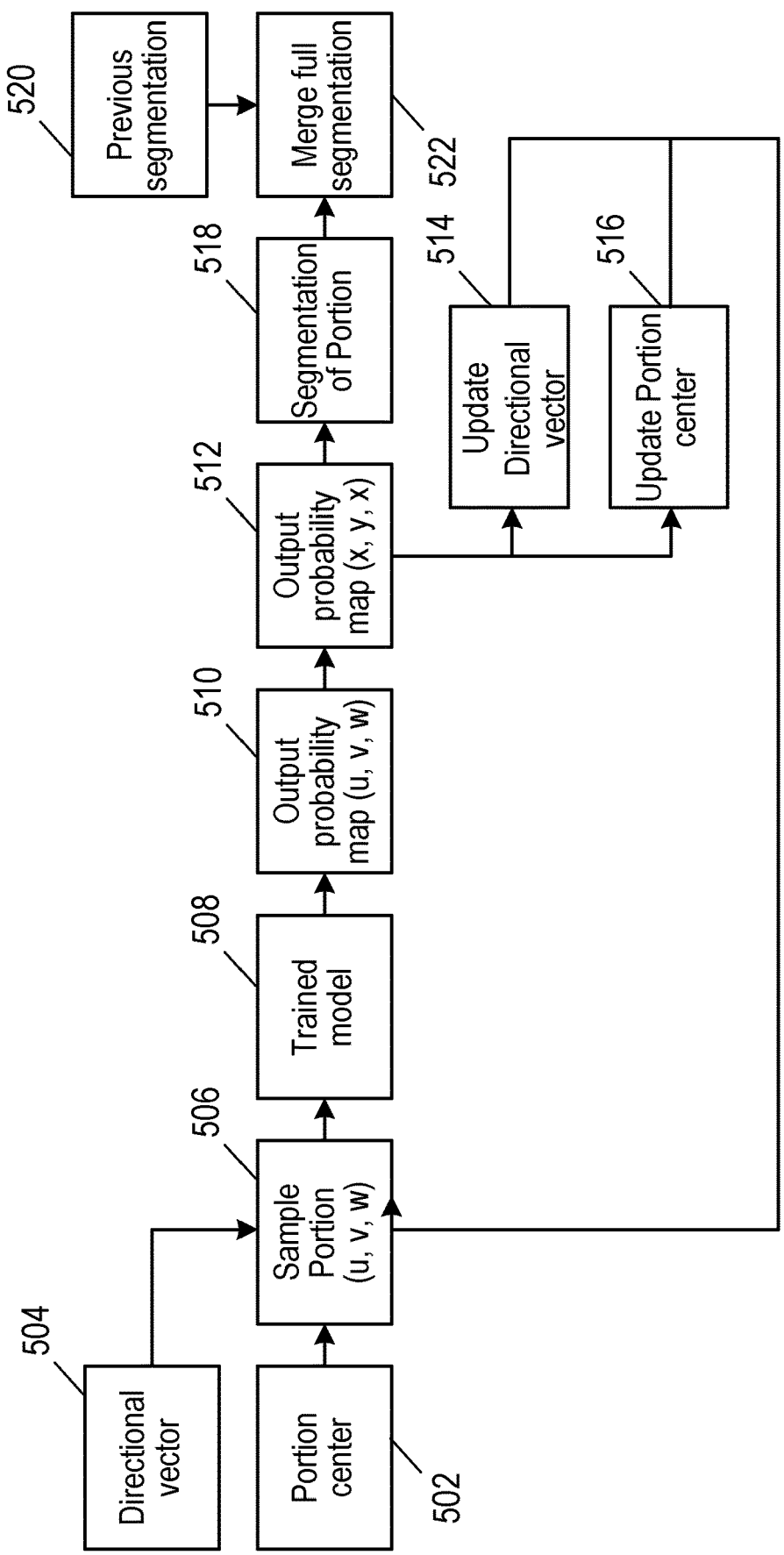
FIG. 5 is a block diagram illustrating a method of segmenting a tubular feature in an image according to some embodiments.

The trained model is used as shown in FIG. 5 whereby in block 502 a coordinate describing the location of center of a portion (e.g. $y_{i+1}$ as illustrated in FIG. 2) and in block 504 a direction (e.g. $d_i$ as illustrated in FIG. 2) are provided as input from which a first portion of the image is determined in block 506. The first portion of the image has a coordinate system (u, v, w) with one of the axes being aligned with the vector $d_i$, as described above. The first portion is provided as input to the trained model in block 508. The trained model has been trained as described with respect to FIG. 4 above. The trained model segments the first portion and outputs a probability map in block 510. The output probability map is in the same coordinate system (u,v,w) as the first portion. The probability map is transformed (e.g. rotated and/or shifted) to the coordinate system of the (main or full) image (x, y, z) in block 512.

From the segmentation of the first portion, a first point comprised in the tubular feature is determined based on the segmentation of the first portion of the image. A first vector lying parallel to the length of the tubular feature at the first point is also determined in block 514. This is performed as described above with respect to block 102 of FIG. 1. The first point and the first vector are used to determine a center coordinate of the next portion of the sequence of portions of the image in block 516 (e.g. using the equation $y_{i+2}=x_{i+1}+a\, d_{i+1}$ as described above with respect to block 102 of method 100). The center coordinate 514 of the next portion and the determined vector 516 are then used to sample or determine the location of the next portion in the sequence in block 506.

Blocks 506, 508, 510, 512, 514, 516 are repeated in this manner to produce a segmentation of a sequence of overlapping portions positioned along the length of the vessel. The segmentation of the portions are merged or combined (e.g. with previous segmentations 520 of previous loops of blocks 506, 508, 510, 512, 514, 516) to form the final segmentation of the full vessel 522, as was described above with respect to block 104 of method 100.

Figure 6B:
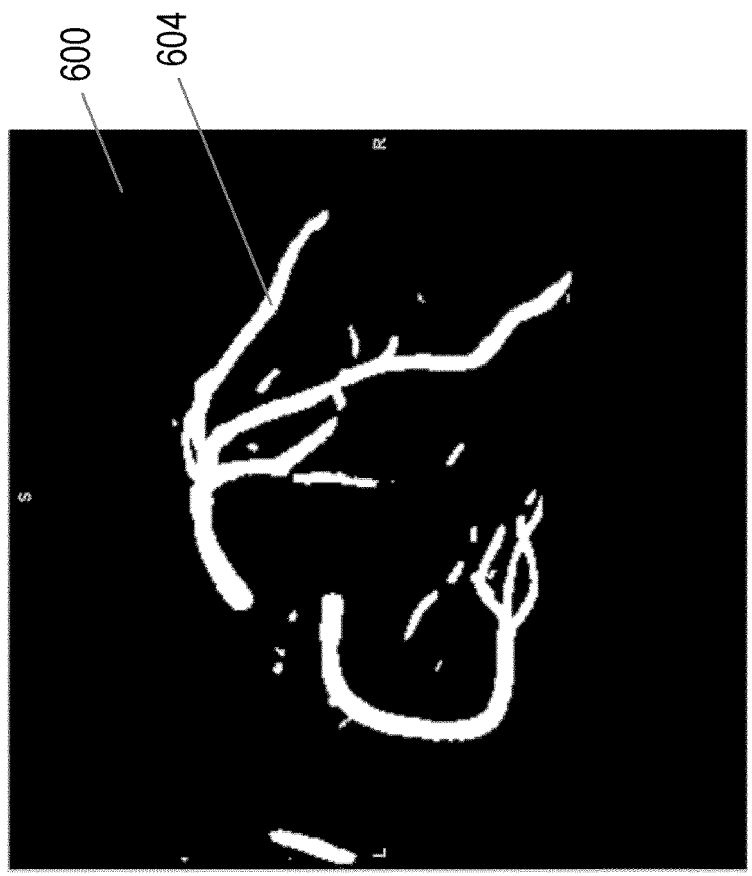
FIG. 6b illustrates a segmentation of the same vascular structure as in FIG. 6a, segmented according to a prior art segmentation method.
Figure 6A:
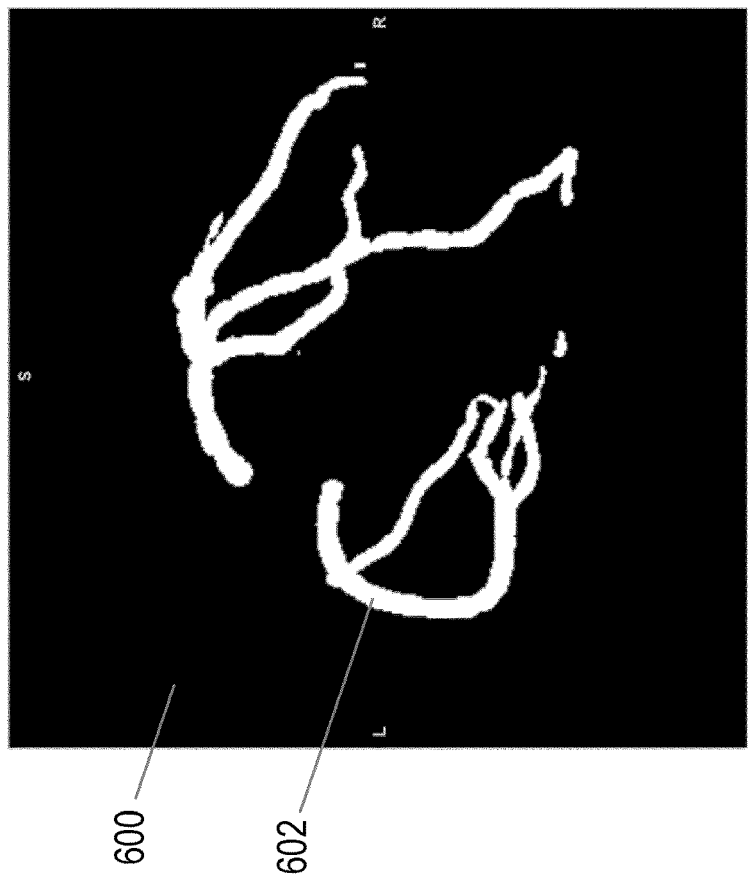
FIG. 6a illustrates an example output segmentation of a vascular structure segmented using an embodiment of a method described herein.

FIG. 6a shows an example output segmentation 600 of an image of a branching vessel 602, using the process described above with respect to FIGS. 3-5. In this example, the starting points $x_i$ and $d_i$ were generated from ground truth data (e.g. a user input starting position and directional vector). FIG. 6b shows a segmentation 604 of the same vessel using a prior art method of segmentation. In this example, the two approaches have dice scores of 0.81 and 0.7 respectively.

Figure 7:
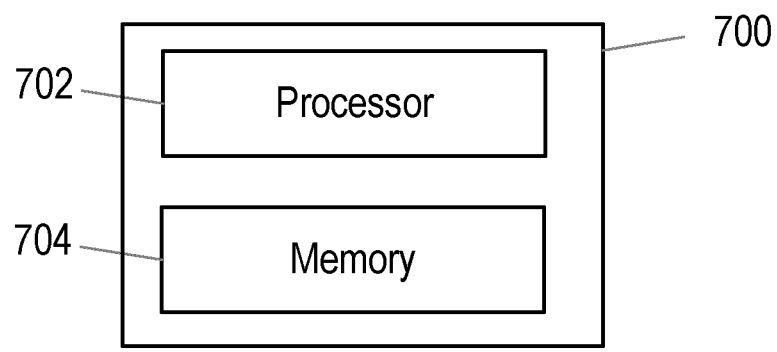
FIG. 7 illustrates a system according to some embodiments herein.

Turning now to other embodiments, as shown in FIG. 7, in some embodiments, there is a system 700 for segmenting a tubular feature in an image. The system may form part of specialized equipment, such as specialized medical equipment, alternatively, the system may form part of a computer system (e.g. such as a laptop, desktop computer, other device or computing cloud). The system comprises a memory 704 comprising instruction data representing a set of instructions and a processor 702 configured to communicate with the memory and to execute the set of instructions. Generally, the set of instructions, when executed by the processor, may cause the processor to perform any of the embodiments of the methods 100, 400 or 500 described above.

More specifically, the set of instructions, when executed by the processor, cause the processor to segment a sequence of overlapping portions of the image using a trained model, the overlapping portions being positioned along the length of the tubular feature, and combine the segmentations of the sequence of overlapping portions of the image to determine the segmentation of the tubular feature.

Segmenting a sequence of overlapping portions of the image was described in detail above with respect to block 102 the method 100 and the details therein will be understood to apply equally to the configuration of the processor 702. Combining the segmentations of a sequence of overlapping portions of the image was described above with respect to block 104 of the method 100 and the details therein will be understood to apply equally to the configuration of the processor 702.

The processor 702 can comprise one or more processors, processing units, multi-core processors or modules that are configured or programmed to control the system 700 in the manner described herein. In particular implementations, the processor 702 can comprise a plurality of software and/or hardware modules that are each configured to perform, or are for performing, individual or multiple steps of the method described herein.

The memory 704 is configured to store program code that can be executed by the processor 102 to perform the method described herein. Alternatively or in addition, one or more memories 704 may be external to (i.e. separate to or remote from) the system 700. For example, one or more memories 704 may be part of another device. Memory 704 can be used to store images, information, data, signals and measurements acquired or made by the processor 702 of the apparatus 700 or from any interfaces, memories or devices that are external to the system 700. The processor 702 may be configured to control the memory 704 to store the images, information, data, signals and measurements.

It will be appreciated that the system 700 may comprise other components such as, for example, one or more user interfaces such as screen or display for displaying the image, and/or the segmentation of the tubular feature. The system may further comprise a user input, such as a keyboard, mouse or other input device that enables a user to interact with the system, for example, to provide initial input parameters to be used in the method described herein.

It will be appreciated that FIG. 7 only shows the components required to illustrate this aspect of the disclosure and, in a practical implementation, the system 700 may comprise additional components to those shown. For example, the system 700 may comprise a battery or other power supply for powering the system 700 or means for connecting the system 700 to a mains power supply.

In another embodiment, there is provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of segmenting a tubular feature in an image, the method comprising:
   segmenting a sequence of overlapping portions of the image using a trained model, the overlapping portions being positioned along the length of the tubular feature; and
   combining the segmentations of the sequence of overlapping portions of the image to determine the segmentation of the tubular feature, wherein segmenting a sequence of overlapping portions of the image comprises:
   segmenting a first portion of the image, the first portion of the image comprising a first portion of the tubular feature;

determining a first point comprised in the tubular feature based on the segmentation of the first portion of the image;
determining a first vector lying parallel to the length of the tubular feature at the first point; and
determining a second portion in the sequence of overlapping portions of the image based on the first point and the first vector, wherein the second portion of the image is determined such that the tubular feature is rotated in the second portion of the image based on the first vector, wherein the tubular feature is rotated such that the first vector lies in a predetermined orientation in the second portion of the image.

2. The method of claim 1, wherein the center of the second portion of the image is determined according to the equation:

$$y_{i+1} = x_i + a\ d_i;$$

wherein $y_{i+1}$ comprises a coordinate at the center of the second portion of the image, $x_i$ comprises a coordinate of the first point, a represents the magnitude of a shift between the first point and the center of the second portion, and $d_i$ comprises the first vector.

3. The method of claim 1, wherein the trained model has been trained on training data comprising i) example images comprising portions of tubular features wherein each example image is rotated based on the predetermined orientation, and ii) corresponding ground truth segmentations for each example image.

4. The method of claim 1, further comprising:
determining a second point comprised in the tubular feature based on a segmentation of the second portion of the image;
determining a second vector lying parallel to the length of the tubular feature at the second point; and
determining a third portion in the sequence of overlapping portions of the image based on the second point and the second vector.

5. The method of claim 1, wherein segmenting the first portion in the sequence of overlapping portions of the image comprises:
determining, for each image element in the first portion of the image, a probability value indicating the probability that the image element is comprised in the tubular feature; and
wherein determining a first point comprised in the tubular feature based on the segmentation of the first portion of the image comprises:
determining the first point based on image elements in the segmentation of the first portion of the image having a probability value above a predetermined threshold.

6. The method of claim 5, further comprising:
determining a third point in the segmentation of the first portion of the image, the third point having a probability value above the predetermined threshold and lying more than a predetermined distance from the first point; and
determining a bifurcation in the tubular feature, based on the locations of the first point and the third point.

7. The method of claim 5, further comprising:
ceasing to segment further portions of the image if a segmentation of a portion in the sequence of overlapping portions comprises probability values that are all below the predetermined threshold.

8. The method of claim 1, wherein combining the segmentations of the sequence of overlapping portions of the image to determine the segmentation of the tubular feature comprises:
averaging image element values in the segmentations of the sequence of overlapping portions of the image in regions of the segmentations that are overlapping.

9. The method of claim 1, wherein the image comprises a medical image and the tubular feature comprises either a blood vessel or a bronchial structure.

10. The method of claim 1, wherein the trained model comprises a trained neural network model or a trained random forest model.

11. A system for segmenting a tubular feature in an image, the system comprising:
a memory comprising instruction data representing a set of instructions; and
a processor configured to communicate with the memory and to execute the set of instructions, wherein the set of instructions, when executed by the processor, cause the processor to:
segment a sequence of overlapping portions of the image using a trained model, the overlapping portions being positioned along the length of the tubular feature; and
combine the segmentations of the sequence of overlapping portions of the image to determine the segmentation of the tubular feature, wherein the step of segmenting a sequence of overlapping portions of the image using a trained model comprises:
segmenting a first portion of the image, the first portion of the image comprising a first portion of the tubular feature;
determining a first point comprised in the tubular feature based on the segmentation of the first portion of the image;
determining a first vector lying parallel to the length of the tubular feature at the first point; and
determining a second portion in the sequence of overlapping portions of the image based on the first point and the first vector, wherein the second portion of the image is determined such that the tubular feature is rotated in the second portion of the image based on the first vector, wherein the tubular feature is rotated such that the first vector lies in a predetermined orientation in the second portion of the image.

12. A non-transitory computer readable medium storing instructions that, on execution by a suitable computer or processor, cause the computer or processor to:
segment a sequence of overlapping portions of the image using a trained model, the overlapping portions being positioned along the length of the tubular feature; and
combine the segmentations of the sequence of overlapping portions of the image to determine the segmentation of the tubular feature, wherein segmenting a sequence of overlapping portions of the image comprises:
segmenting a first portion of the image, the first portion of the image comprising a first portion of the tubular feature;
determining a first point comprised in the tubular feature based on the segmentation of the first portion of the image;
determining a first vector lying parallel to the length of the tubular feature at the first point; and
determining a second portion in the sequence of overlapping portions of the image based on the first point and the first vector, wherein the second portion of the image is determined such that the tubular feature is rotated in the second portion of the image based on the first vector, wherein the tubular feature is rotated such that the first vector lies in a predetermined orientation in the second portion of the image.

* * * * *